United States Patent [19]

Cogan

[11] 4,319,095
[45] Mar. 9, 1982

[54] TELEPHONE HANDSET TRANSDUCER MOUNTING

[75] Inventor: Fredrick T. Cogan, London, Canada

[73] Assignee: Northern Telecom Limited, Montreal, Canada

[21] Appl. No.: 157,271

[22] Filed: Jun. 6, 1980

[51] Int. Cl.³ .............................................. H04M 1/03
[52] U.S. Cl. .................................... 179/103; 179/179
[58] Field of Search ................ 179/103, 178, 179, 180

[56] References Cited

U.S. PATENT DOCUMENTS 4,163,875  8/1979  Cogan ................................. 179/103

FOREIGN PATENT DOCUMENTS 1437751  6/1976  United Kingdom ................ 179/178

*Primary Examiner*—George G. Stellar
*Attorney, Agent, or Firm*—Sidney T. Jelly

[57] ABSTRACT

A mounting for a transducer in a telephone handset comprises a flexible tubular gasket which is attached to the front housing by projections at a front end which fit under ribs extending from the side walls of the housing. The transducer clips into the gasket, being held in place by an inwardly projecting rim at a rear end of the gasket. The handset has a front and back housing forming an elongate hollow enclosure with two tranducers, a transmitter at one end and a receiver at the other. Either or both transducers may be attached by the mounting, the transmitter being particularly suitable. At least one buttress is provided for longitudinal location of the gasket. A flexible insert on the back of the back housing covers fastening screws. A cord inlet at the transmitter end provides alternate anchorage means for a hand wired line cord on support means for a modular jack.

18 Claims, 14 Drawing Figures

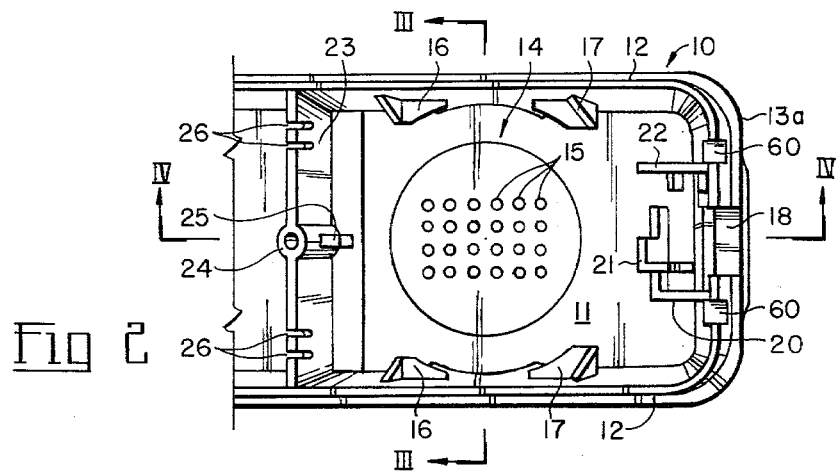
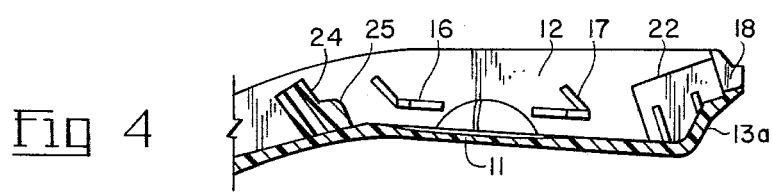
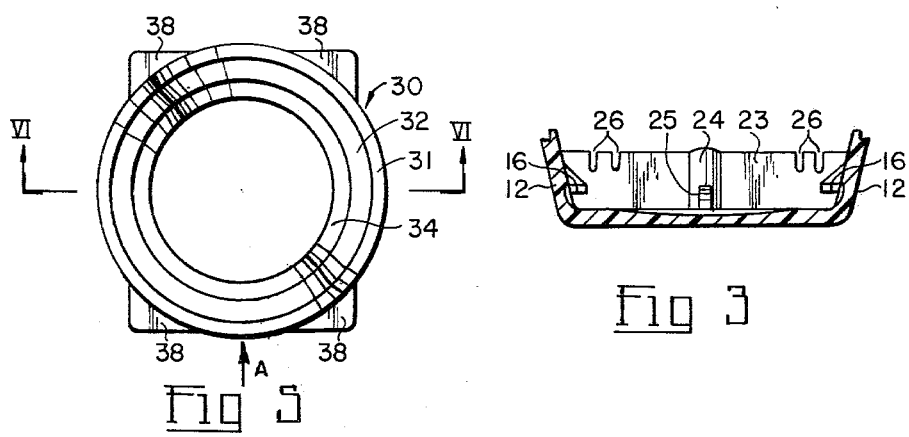
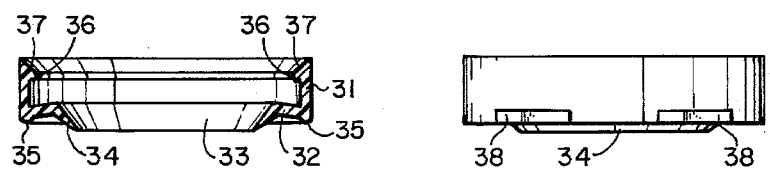

TELEPHONE HANDSET TRANSDUCER MOUNTING

This invention relates to the mounting of a transducer in a telephone handset, and also to a telephone handset incorporating such mounting, and particularly to the mounting of a transmitter.

The present invention provides an assembly which is quick and easy to do, retains the transducer in the handset once assembled and will withstand rough handling prior to complete assembly of the handset and also provides good acoustic sealing between transducer and handset housing.

A handset comprises two housings, a front housing and a back housing, the front housing having mounting positions for a transmitter and a receiver. The two housings assemble together to provide a hollow enclosure. Broadly, in accordance with the invention, the front housing, at the transducer mounting position, has ribs or webs extending from the sides of the housing, spaced from and parallel to the front face of the housing. At least two ribs are positioned on each side and a flexible gasket is slid in, four projections spaced around the gasket sliding under the ribs. The gasket is flexed as it is slid into position and in its final position is located between two buttresses which locate the gasket longitudinally, that is along the longitudinal axis of the housing. The gasket has a central aperture at its front end with a tapered rim which is flexed into firm contact with the front face of the housing, around perforations in the front face. The gasket has an upstanding rim extending away from the front end and at its rear end has an inwardly projecting circumferential rib. After assembly of the gasket to the housing, the transducer is pushed into the gasket. The circumferential rib expands until the transducer is fully inserted, when the rim snaps back over the rear of the transducer, forcing the front rim of the transducer into tight sealing contact with the gasket.

The back housing may carry terminals for making contact with the transducer, or a modular jack may be used. The handset cord either has its conductors soldered to the terminals for the receiver, the transmitter, or has a modular plug which inserts in the jack.

The two housings are fastened together by screws through the back housing screwing into hollow bosses in the front housing. A flexible plastic strip can be clipped on to the back housing after assembly of the two housings, hiding the screws.

The invention will be readily understood by the following description, in conjunction with the accompanying drawings, in which:

FIG. 2 is a plan view of the transmitter end of a front housing illustrating the interior of the housing;

FIG. 3 is a cross-section on the line III—III of FIG. 2;

FIG. 4 is a cross-section on the line IV—IV of FIG. 2;

FIG. 5 is a plan view of a gasket viewed from the rear end;

FIG. 6 is a cross-section on the line VI—VI of FIG. 5;

FIG. 7 is a side view of the gasket of FIGS. 5 and 6, in the direction of arrow A of FIG. 5;

Figure 1:
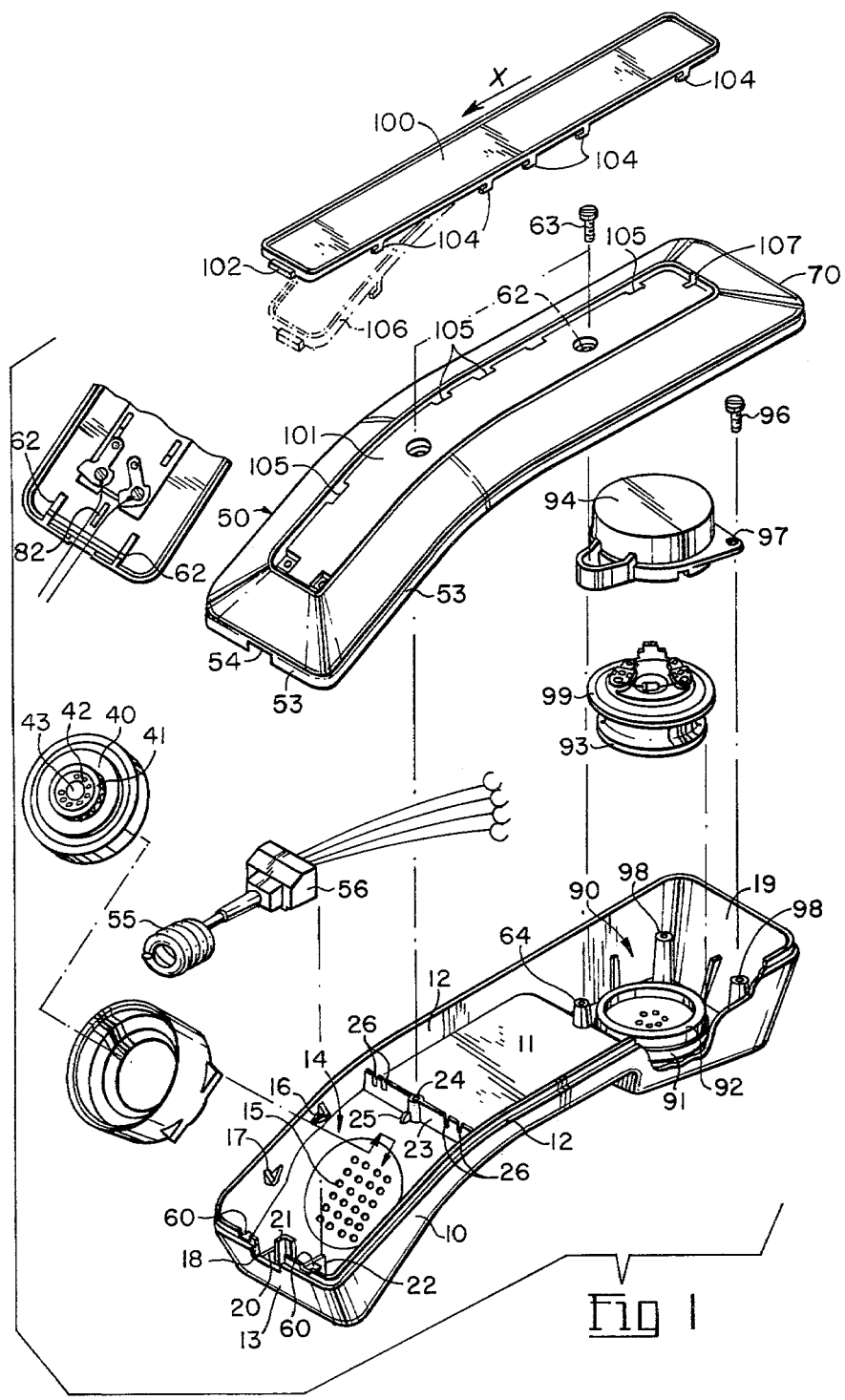
FIG. 1 is an exploded perspective view of a handset.

As seen in FIGS. 1, 2, 3 and 4, the front housing 10 is in the form of a hollow shell of channel shaped cross-section having a front face 11, sides 12 and ends 13 and 19. The transmitter position is indicated generally at 14, there being perforations through the front face at 15 for speech to reach the transmitter.

Two ribs 16 and 17 extend from each side 12 spaced from and parallel to the front face. In the end 13 there is a slot 18 through which the handset cord can enter the handset. In the example a series of ribs or webs 20, 21 and 22 extend up from the front face to form a mounting for a modular jack, if to be provided or act as an anchorage device for an alternate form of line cord. The web 21 also acts as a buttress at one end for the gasket. Extending across the housing on the side of the transmitter position remote from end 13 is a transverse web 23. In the center of the web 23 is a hollow boss 24 and on the side of the boss facing towards the transmitter position 14 is a small rib 25, which acts as a buttress for the other end of the gasket. Narrow slots 26 in the web 23 provide positions for locating conductors passing to the receiver.

FIGS. 5, 6 and 7 illustrate a gasket 30. The gasket comprises a cylindrical body portion 31 having a front end 32 in which there is an aperture 33. The aperture has a tapered edge or rim 34 which projects beyond the front end. A shallow rib 35 extends around the periphery at the front end. The body portion extends from the front and at the rear end there is an inwardly projecting rim 36 having an inclined upper surface 37. Four projections 38 extend from the periphery of the gasket at the front end.

Figure 8:
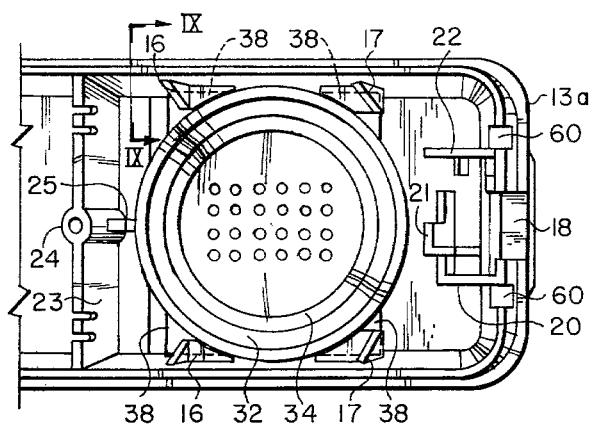
FIG. 8 is a plan view similar to that of FIG. 2, but with the gasket assembled to the housing.
Figure 9:
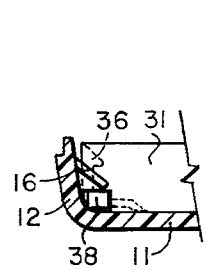
FIG. 9 is a cross-section on the line IX—IX of FIG. 8.

The gasket is inserted by sliding in from the transverse web 23. The projections 38 are eased under the ribs 16 and 17, the gasket being flexed, until it is fully inserted, when it moves against the web 21 and moves down in front of rib 25. As the gasket is pushed into position, the tapered edge or rim 34 is deflected up as it moves into contact with the front face 11 of the housing. This provides a good effective acoustic seal between gasket and housing. The assembly of gasket and housing is illustrated in FIGS. 8 and 9.

Figure 10:
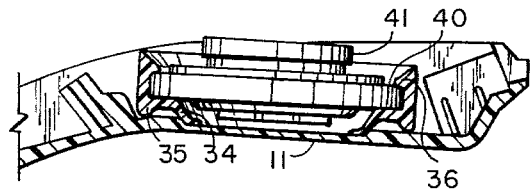
FIG. 10 is a cross-section similar to that of FIG. 4, but with the gasket and transmitter assembled to the front housing.
Figure 11:
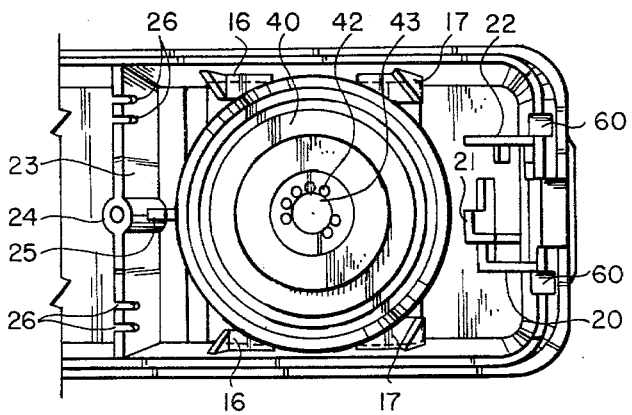
FIG. 11 is a plan view similar to that of FIG. 2, but with gasket and transmitter assembled to the housing.

FIGS. 10 and 11 illustrate the assembly of the transmitter to the gasket. In FIG. 10 the gasket and housing are in cross-section but the transmitter is not. It will be seen that the tapered edge or rim 34 is deflected upward and forms a seal with the front face of the housing. Also the rim 35 rests on the front face. The transmitter main body portion 40 fits under the inwardly extending rim 36 and again there is a seal, between gasket and transmitter. The central part of the transmitter, at 41 projects above the gasket, with contact areas 42 and 43 thereon.

Figure 12:
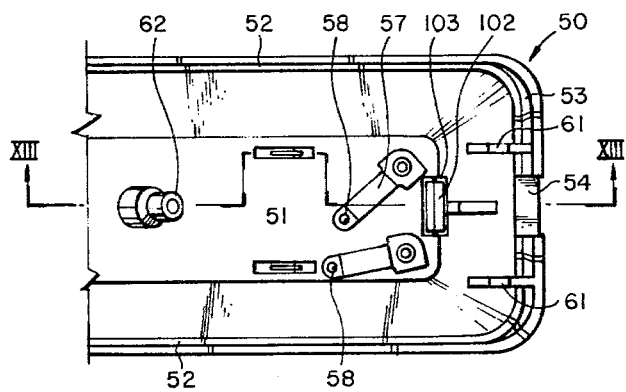
FIG. 12 is a plan view of the transmitter end of a back housing, illustrating the interior.
Figure 13:
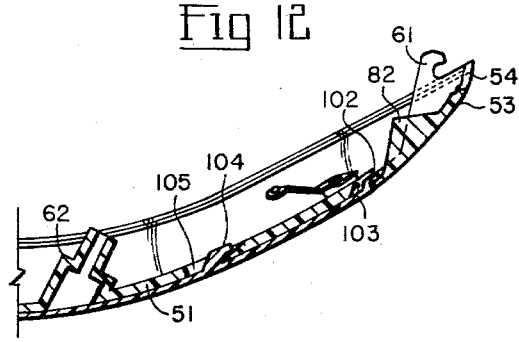
FIG. 13 is a cross-section on the line XIII—XIII of FIG. 12.

FIGS. 12 and 13 illustrate the transmitter end of the back housing 50 which has a back face 51, sides 52 and ends 53 and 70. A slot 54 in the end 53 cooperates with the slot 18 in the end of the front housing to define an aperture. In the example illustrated and particularly as seen in FIG. 1, a hard wired line cord 55 is provided. This has a strain relief 56 molded on to the cord and the strain relief fits into the aperture formed by slots 18 and 54 and also fits behind the upper rim of the ends 13 and 53. Two terminals 57 are rivetted to the back housing, on the inside and carry contacts 58 on their end which make contact with the contact areas 42 and 43 respectively of the transmitter when the two housings are assembled together.

In the front housing 10, at the end 13, on the outside of the ribs 20 and 22 are two hook-shaped members 60. The hooks are downward and inward facing, towards the front face 11. On the back housing are two further hook-shaped members 61, the hooks facing outward and toward the back face 51. When the two housings are assembled together the hook-shaped members 60 and 61 interengage and hold the housings together at the end. Two hollow bosses, one of which is seen at 62, in the back housing are aligned with bosses in the front housing, one being indicated at 24. The bosses 62 are counterbored, and screws 63 pass through the bosses 62 into boss 24 and a further hollow boss 64 near the receiver, the heads of the screws being housed in the counterbores.

Figure 14:
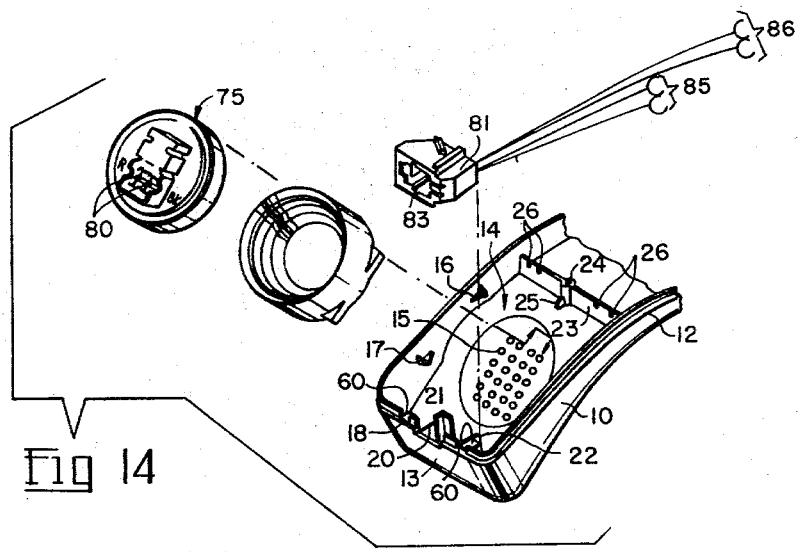
FIG. 14 is an exploded perspective view of the transmitter end of FIG. 1 illustrating a modification thereof.

An alternative form of transmitter 75 is illustrated in FIG. 14, and also is designed for a modular line cord. The front housing is the same as in FIG. 1 and the back housing does not have terminals 57. The transmitter 75 has two insulation slicing terminals 80 on the back, but otherwise the arrangement is the same as in FIGS. 1, and FIGS. 2 to 11. A modular jack 81 fits in the space defined by the ribs 20, 21 and 22 and is held down in that space by a rib 82 on the back housing. The aperture 83 of the jack is aligned with the aperture formed by slots 18 and 54. Four conductors in two pairs 85 and 86 extend from the jack, one pair 85 going to the transmitter and the other to the receiver.

It is possible to also use the hard wired type of line cord 55, with strain relief 56, with the transmitter 75 as in FIG. 14, two of the conductors being terminated in the terminals on the back of the transmitter and the other two going to the receiver. Similarly it is possible to use the modular jack 81 of FIG. 14 with the transmitter 40 as in FIGS. 1, 10 and 11. In this case two conductors are connected to terminals 57 and the other two conductors go to the receiver.

It is also possible to use the same arrangement for mounting the receiver. A flexible gasket is formed to fit on the receiver position. This position is seen at 90 in FIG. 1, and comprises a sealing 91 on which is normally positioned a sealing ring 92. The receiver 93 sits on the ring 92 and a cover 94 fits over the receiver and is held down by screws 96, passing through holes 97 in the cover into hollow bosses 98. To use a gasket, as for the transmitter, the seating 91 is made flat and ribs, similar to ribs 16 and 17 for the transmitter end, are formed on the walls 12 at the receiver position. The gasket would fit over the periphery of the receiver 93. The gasket would be slid in, as for the transmitter, and then the receiver pushed down into the gasket, the top rim of the gasket snapping over the top peripheral edge 99 of the receiver.

The screws 63 holding the two housings together are hidden by an insert 100 positioned in an elongate recess 101 in the back surface of the back housing. The insert is flexible, to follow the contour of the back housing, and has a tongue 102 at the transmitter end which fits in a slot 103 (FIGS. 12 and 13) in the back housing at the end of the recess 101 adjacent to the transmitter.

Along each side of the insert are a plurality of hook shaped members 104 which fit into apertures 105 spaced along each side of the recess 101. The insert is applied by pushing down to insert the hook shaped members through the apertures with the tongue 102 aligned with the slot 103, the end of the insert being held down, as indicated by the dotted outline 106. The insert is then pushed lengthwise, to the left in FIG. 1, as indicated by arrow X and the hooked members engage under the back surface of the back housing, the tongue 102 enters the slot 103, and the end of the insert adjacent to the receiver snaps down into the recess, preventing movement of the insert back to the right. To remove a tool is inserted at this latter end, via a small groove 107 at the end of the recess, and the insert end levered up out of the recess. The insert can then be moved to the right, disengaging the hook members and the tongue.

What is claimed is:

1. A mounting for a transducer in a telephone handset having a front housing and a back housing forming a hollow enclosure, said front housing having at least one transducer mounting position, said mounting comprising:

ribs extending inward from opposite sides of the front housing, the ribs spaced from and parallel to a front face of the front housing;

a flexible gasket having a cylindrical body portion and an aperture in a front end of the body portion, said aperture having an inwardly extending tapered rim, said rim extending forwardly of the front surface of said front end;

an inwardly projecting rim at a rear end of the gasket, the rim having a rearwardly and upwardly inclined rear surface; and projections extending from the body portion at said front end, said projections positioned under said ribs extending from said front housing, said tapered rim deformed against the front face of the front housing; and at least one buttress in said front housing locating said gasket longitudinally in said front housing.

2. A mounting as claimed in claim 1, including a transducer positioned in said body portion of said gasket, said inwardly projecting rim extending over a rear surface on said transducer.

3. A mounting as claimed in claim 2, said transducer being a transmitter.

4. A telephone handset comprising a front housing and a back housing, the two housings forming an elongate hollow enclosure, two transducer mounting positions in the front housing, one at each end, one transducer being a transmitter and the other a receiver;

said handset including at at least one of the transducer positions a transducer mounting comprising ribs extending inward from opposite sides of said front housing, said ribs extending substantially parallel to and spaced from a front face of the front housing;

a flexible gasket having a cylindrical body portion with a front and a rear end;

an inwardly extending tapered rim at said front end defining an aperture in said front end, the rim extending forwardly of said front end, an inwardly projecting rim at said rear end, and projections extending from the body portion at said front portion and positioned under said ribs extending from the sides of the front housing, the gasket resiliently biased towards said front face of the front housing and deforming said tapered rim into sealing engagement with said front housing;

at least one buttress in said front housing locating said gasket longitudinally;

a transducer positioned in said gasket, said inwardly projecting rim extending over a rear face on said transducer, and means for connecting electrical conductors to said transducer.

5. A handset as claimed in claim 4, said transducer being a transmitter, positioned at one end of said front housing.

6. A handset as claimed in claim 5, including a slot in an end face of the front housing at said one end and a plurality of webs extending up from said front face of said front housing, a web positioned on each side of said slot, one of said webs forming said buttress.

7. A handset as claimed in claim 6, said webs forming an anchorage for a line cord extending through said slot.

8. A handset as claimed in claim 7, including cantilever spring contacts attached to an inside surface of said back cover, said contacts in electrical contact with contact areas on said transmitter, conductors from said line cord attached to said contacts.

9. A handset as claimed in claim 7, including contacts on a back surface of said transmitter, conductors from said line cord attached to said contacts.

10. A handset as claimed in claim 6, said webs forming a mounting for a jack, said jack aligned with said slot for reception of a line cord plug.

11. A handset as claimed in claim 10, including cantilever spring contacts attached to an inside surface of said back cover, said contacts in electrical contact with contact areas on said transmitter, conductors from said line cord attached to said contacts.

12. A handset as claimed in claim 10, including contacts on a back surface of said transmitter, conductors from said line cord attached to said contacts.

13. A handset as claimed in claim 4, including a transverse web extending across said front housing on the side of the transducer remote from said one end and a rib extending from said transverse web towards said one end, said rib forming a further buttress for said gasket.

14. A handset as claimed in claim 4, including cooperating means at an end of said front housing and said back housing for retaining said housings together, said cooperating means comprising a first pair of hook-shaped members on an end wall of the front housing at said one end and a second pair of hook-shaped members on an end wall of the back housing at said one end, said hook-shaped members on the back housing engaging under said hook-shaped members on the front housing.

15. A handset as claimed in claim 14, including a hollow boss on said front housing extending upward from a front face, a further hollow boss extending forward from an inner surface of said back housing, aligned with said boss on said front housing, and a screw passing through the hollow boss on said back housing and threaded into the hollow boss on said front housing.

16. A handset as claimed in claim 14, including a rim extending around the periphery of the front housing, said rim inset from the sides and ends of the housing, and a further rim extending around the periphery of the back housing, said rims interengaging to locate said housings relative to each other.

17. A handset as claimed in claim 4, including an elongate recess in a back outer surface of the back housing and a plurality of apertures through the back of the back housing along each side of said recess, and an insert in said recess, said insert having a front face in contact with the back surface of the housing and a plurality of hook-shaped members extending from the front face and passing through said back of said back housing and engaging with said back to retain said insert in position.

18. A handset as claimed in claim 17, said front and back housings of arcuate form received in side view, said back of said back member arcuate to conform with said arcuate form of said back member, said insert being flexible and including a tongue at one end, an aperture in said back member at an end of said recess, said tongue extered in said aperture to locate said insert.

* * * * *